2,540,974

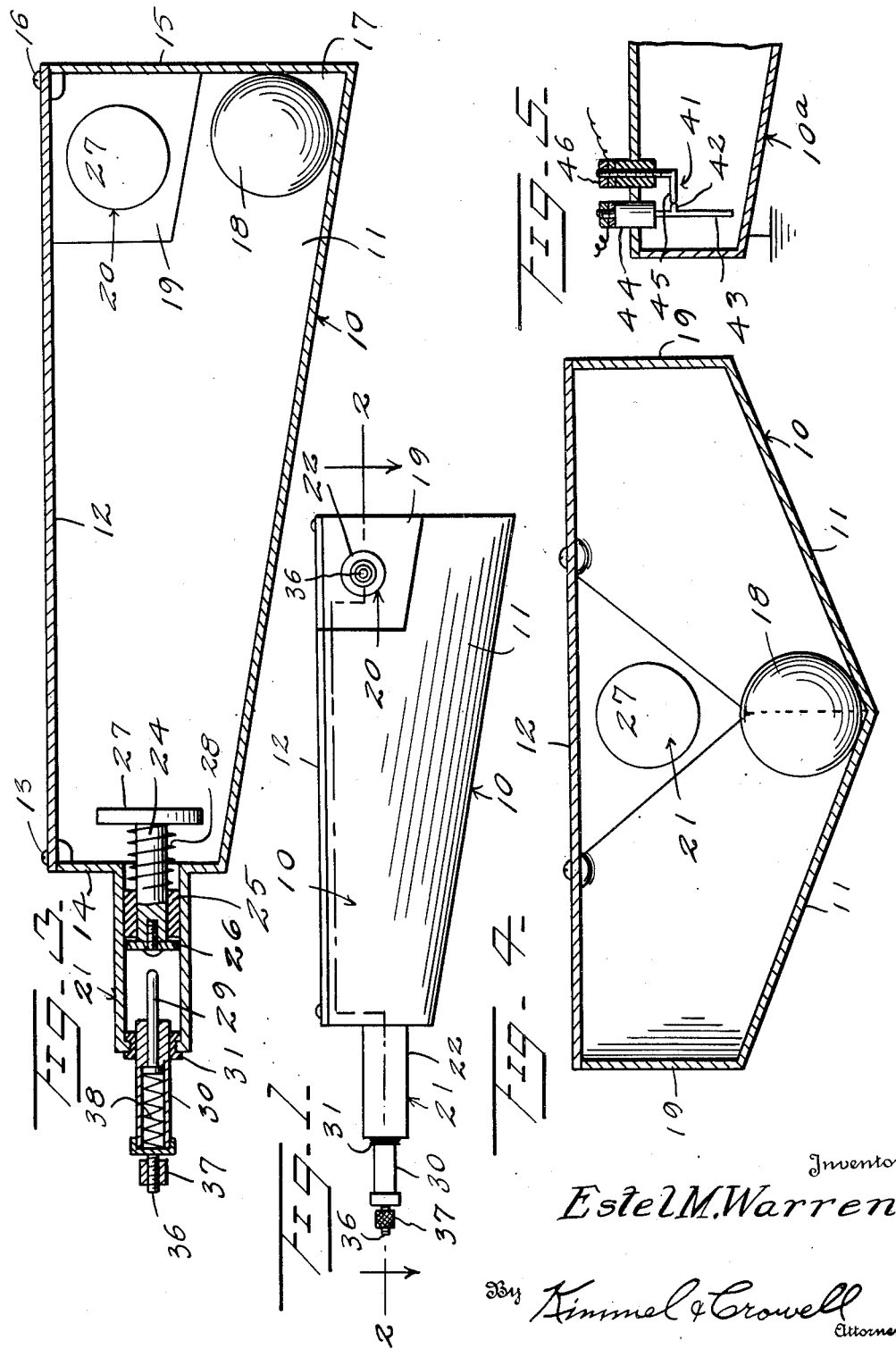

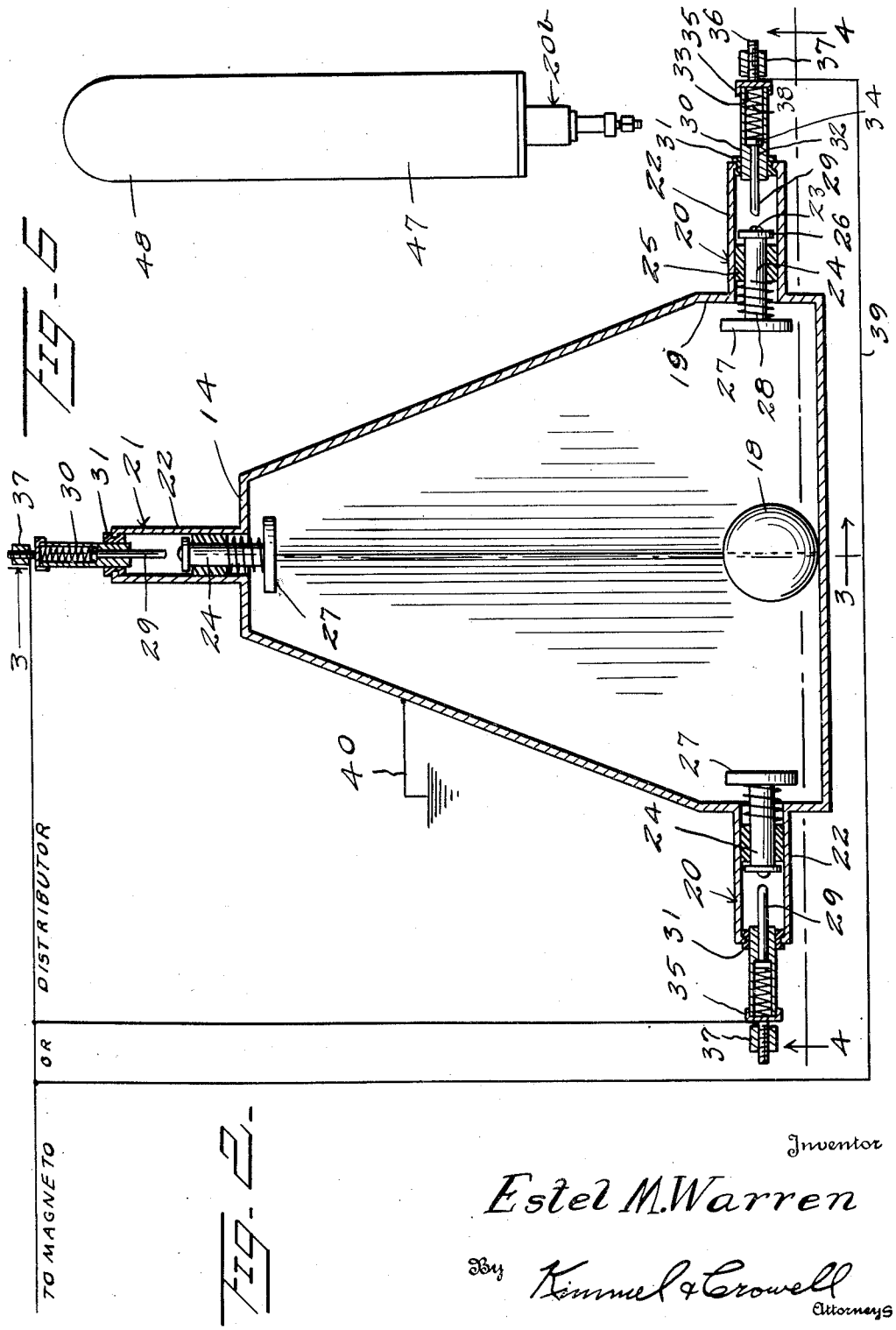
Feb. 6, 1951 — E. M. WARREN — 2,540,974
SAFETY SWITCH
Filed June 30, 1947 — 2 Sheets-Sheet 2
Inventor
Estel M. Warren
By Kimmel & Crowell
Attorneys Patented Feb. 6, 1951

UNITED STATES PATENT OFFICE 2,540,974

SAFETY SWITCH

Estel M. Warren, Clinton, N. C.

Application June 30, 1947, Serial No. 758,117

2 Claims. (Cl. 200—52)

This invention relates to a safety switch for mounting on a vehicle, such as a tractor or the like, which will stop the operation of the engine when the vehicle tilts to a predetermined angle.

In the operation of tractors or like vehicles, on hilly ground or on level ground when the vehicle is under heavy pull, the tractor may turn backwards and upside down, or may roll over due to the angle of the tractor, and this results in both damage to the tractor and possible injury to the operator. It is an object of this invention to provide an improved tilt switch for mounting on the tractor and connection with the ignition circuit which will ground the ignition circuit and in this manner stop the engine before the tractor tilts beyond a predetermined dangerous angle.

Another object of this invention is to provide a safety switch of this kind which is simple in construction and is normally inoperative, but is gravity operated when the tractor tilts.

With the above and other objects in view, my invention consists in the arrangement, combination and details of construction disclosed in the drawings and specification, and then more particularly pointed out in the appended claims.

In the drawings,

Figure 1 is a detail side elevation of a safety switch adapted to be mounted on a tractor or other vehicle, constructed according to an embodiment of this invention, Figure 2 is a sectional view, partly diagrammatic, taken on the line 2—2 of Figure 1, Figure 3 is a sectional view taken on the line 3—3 of Figure 2, Figure 4 is a sectional view taken on the line 4—4 of Figure 2, Figure 5 is a fragmentary sectional view of a modified form of this invention for use in a battery circuit, Figure 6 is a plan view of a type of switch.

Referring to the drawings, the numeral 10 designates generally a housing which is formed of a V-shaped bottom wall 11, a top wall 12, secured to a rear end wall 14 by fastening members 13, and to a front wall 15 by fastening members 16.

The front wall 15 forms, with the V-shaped bottom wall 11, a track or guide 17 within which a switch operating sphere 18 is adapted to loosely engage. The housing 10 also includes a pair of vertical walls 19 at the opposite ends of the guide 17, and a pair of enclosed switch members generally designated as 20 are secured to the vertical walls 19.

A rear switch 21, similar to the switch 20, is secured and extends from the rear wall 14. Each switch comprises a sleeve 22 within which a movable contact 23 is mounted. The contact 23 is secured to a shank or shaft 24 which is slidable in an inner sleeve 25 carried by the sleeve or housing 22. A washer 26 is carried by the inner end of the shank 24 and is adapted to abut against the inner end of the sleeve 25.

The shank 24, within the housing 10, has secured thereto a head 27 against which the sphere 18 is adapted to engage when the housing 10 is tilted either laterally or longitudinally. A spring 28 is interposed between the head 27 and the sleeve 25 so as to constantly urge the movable contact 23 to circuit breaking position.

A second contact 29 is slidably carried by a stud 30 which is insulated by insulating means 31, from the outer end of the housing 22. The stud 30 is formed with a reduced diameter bore 32 and is also provided with a larger diameter bore 33 extending from the outer end of the bore 32, and within which a head 34 carried by the outer contact 29 is adapted to slidably engage.

A cap 35 is mounted on the outer end of the stud 30 and has secured thereto a threaded shank 36 on which a terminal nut 37 is threaded. A spring 38 is disposed in the bore 33, bearing at its outer end against the cap 35 and bearing at its inner end against the head 34. The spring 38 provides a cushioning means to cushion the shock caused by engagement of contact 23 with contact 29.

The terminal nut 37 is adapted to secure one end of a conductor 39 to the switch 20, and the conductor 39 is adapted at the opposite end thereof to be connected to a magneto forming the source of electric current supply for the tractor engine or the like. A second conductor 40 is connected to the housing 10 and is also connected to the ground so that when the ball or sphere 18 engages one of the switch members, that is, either one of the switches 20 extending laterally from the housing or the rear switch 21, the electric circuit of the magneto which is connected to the ignition system of the engine will be grounded. In practice the housing is mounted either on the engine or vehicle chassis and is grounded thereby.

Referring to Figure 5 there is disclosed a modified form of this invention for use in a battery type ignition circuit. The housing 10a is constructed similar to the housing 10, but in place of the normally open switches used in the magneto circuit, a normally closed switch 41 is provided and is interposed at any suitable point in the ignition, such as between the high tension coil and the distributor. The switch 41 comprises a contact 42 which is carried by a resilient strip or carrier 43 connected to a terminal 44 which is grounded to the housing 10a. A second contact 45 is disposed in confronting position to and normally engages contact 42. Contact 45 is connected to a terminal 46 which is insulated from housing 10a. The ball upon engagement with contact carrier 43 will bend the carrier outwardly and disengage contact 42 from contact 45.

In Figure 6 there is disclosed a single type of enclosed switch structure embodying a tubular housing 47 within which a ball switch operator similar to ball 18 is loosely mounted. A switch 20b formed as switch 20 is mounted in one end of the housing 47 and is interposed in the magneto ignition circuit. The housing 47 is adapted to be mounted on an inclination to the vertical so that the ball operator will normally engage in the rounded end 48 of the housing. The housing 47 is mounted either on the engine or fixed to the frame or body of the vehicle. The housing 47 is elongated and free from obstructions interiorly thereof to permit the unobstructed sliding or rolling of a ball therein. The switch 20b is constructed in every detail as the switch 20 described above. As only one switch is provided at one end of the housing 47 this switch will be actuated by the excessive tilting of the tractor in one direction along the length of the housing. Aside from the shape of the housing 47 and the mounting of but one switch therein, the use and operation of the switch shown in Figure 6 is the same as the use and operation of the switch shown in Figures 1 to 4 when tilting the tractor in any one direction.

In the use and operation of the switch shown in Figures 1 to 5, the housing 10 is adapted to be secured to a suitable bracket or other attaching means and mounted on the tractor in a substantially horizontal position. The tractor may be used in the normal manner but when the tractor tilts laterally to a predetermined degree, depending on the angle formed by the two divergent sides of the bottom 11, the ball 18 will roll laterally by gravity and will engage one of the heads 27 which is lowermost. Engagement of the ball 18 with a lower head 27 will cause this head to move outwardly so that contact 23 will engage contact 29. At this time the ignition circuit in which the magneto is interposed will be grounded and the engine will stop.

In the event the tractor is moved forwardly and upwardly over hilly ground, and the inclination of the tractor exceeds a predetermined dangerous angle, or if the tractor is under heavy pull on level ground causing the front end to rise off the ground beyond a predetermined dangerous angle, the ball 18 will roll rearwardly and downwardly in the angle formed by the divergent bottom sides 11, and will strike the rear switch. The rear switch will thereupon be closed so that the tractor cannot move forwardly until the angle of the tractor has been changed.

With a switch as hereinbefore described, a conventional tractor will be insured against tipping over, either laterally or rearwardly so that the tractor will not be damaged by tipping over either rearwardly or laterally and the operator will not be injured. This safety switch can be constructed at small cost and being sealed as to the switch operator, the switch will not get out of order, and as soon as the tractor has the angle reduced from a dangerous angle to a lesser safe angle, the switch operating ball 18 will roll toward the center of the housing, and spring 28 will move contact 23 out of engagement with contact 29.

I do not mean to confine myself to the exact details of construction herein disclosed, but claim all variations falling within the purview of the appended claims.

What I claim is:

1. An enclosed safety switch adapted to be interposed in an ignition circuit comprising a housing mounted with at least the lower wall thereof inclined relative to the horizontal, said housing having a high end formed as an extension thereof, a normally open switch carried by the high end of said housing and enclosed by said extension, said switch including a fixed contact resiliently mounted on said high end, and a movable contact carried by a plunger slidably mounted in said extension and normally resiliently biased inwardly of said housing, and a plunger actuating member movably disposed in said housing and normally positioned at the low end thereof and adapted, upon raising of said low end above a horizontal plane passing through said normally high end, to move along said lower wall towards said normally high end to engage said plunger for closing said switch.

2. An enclosed safety switch adapted to be interposed in an ignition circuit comprising an elongated tubular housing having the opposite ends thereof closed and adapted to be mounted with the longitudinal axis thereof inclined relative to the horizontal, a high end of said housing having a sleeve-like extension extending outwardly thereof, said extension having an axial bore communicating with and centered relative to the bore of said housing, a normally open switch carried by said extension having an enclosed contact spaced from a plunger member slidably extending into the housing, said plunger being positioned to engage said enclosed contact when depressed to close said switch, and a spherical member loosely disposed within said housing and normally positioned at the low end thereof and adapted, when said low end is raised above a horizontal plane passed through said normally high end, to roll along said housing towards said normally high end to depress said plunger for closing said switch.

ESTEL M. WARREN.

REFERENCES CITED

The following references are of record in the file of this patent:

UNITED STATES PATENTS

| Number | Name | Date |
|---|---|---|
| 1,393,312 | Perry | Oct. 11, 1921 |
| 1,633,386 | Rutledge | June 21, 1927 |
| 2,456,799 | Smies | Dec. 21, 1948 |

FOREIGN PATENTS

| Number | Country | Date |
|---|---|---|
| 377,872 | Germany | June 28, 1923 |
| 741,298 | France | Dec. 3, 1932 |